(No Model.)

A. J. BALCH.
STOCK WATERER.

No. 326,829.   Patented Sept. 22, 1885.

WITNESSES
Chas. H. Davis,
Wm. N. Gass.

INVENTOR
Andrew J. Balch
By C. W. Alexander
his Attorney

UNITED STATES PATENT OFFICE.

ANDREW J. BALCH, OF HALSTEAD, KANSAS, ASSIGNOR OF TWO-THIRDS TO L. P. LESTER AND G. W. GETROST, OF SAME PLACE.

STOCK-WATERER.

SPECIFICATION forming part of Letters Patent No. 326,829, dated September 22, 1885.

Application filed July 23, 1885. (No model.)

*To all whom it may concern:*

Be it known that I, ANDREW J. BALCH, a citizen of the United States, residing at Halstead, in the county of Harvey and State of Kansas, have invented certain new and useful Improvements in Stock-Waterers, of which the following is a specification, reference being had therein to the accompanying drawings.

My invention relates to fountains for watering stock, and the apparatus which I use is so constructed that the animal in the act of drinking will cause the water to flow, said flow ceasing when the animal leaves the fountain.

In the accompanying drawings, making part of this specification, the figures represent vertical sections.

In the figures, A represents a water-tank, which may be made as large as desirable and filled in any convenient manner. Connected to this tank is a pipe, B, which may either be in section, as shown, or simply cast or formed curved at its outer end. D is a short section of pipe, which screws into the pipe B at one end and into a tube, E, at the other. This tube E is a tubular extension of the bowl or fountain C. This fountain is made sufficiently large to accommodate the heads of horses or cattle or hogs, &c.

F represents a short pipe, which screws from the interior of the bowl into the tubular extension E. The interior of the lower end of pipe is beveled in such manner as to form a valve-seat. Centrally around the periphery of this pipe is a flange, $x$ $x$.

$d$ represents a perforated cap, which covers the mouth of pipe F. This cap is provided with a stem, which passes down through the pipe F, and has secured to its lower end a hollow valve, $a$. This valve is to open or close the lower end of pipe F, for admitting or shutting off the water. When the valve is down, so as to admit of a flow of water, the rim of the cap $d$ will rest upon the flange $x$ $x$.

Figure 1:
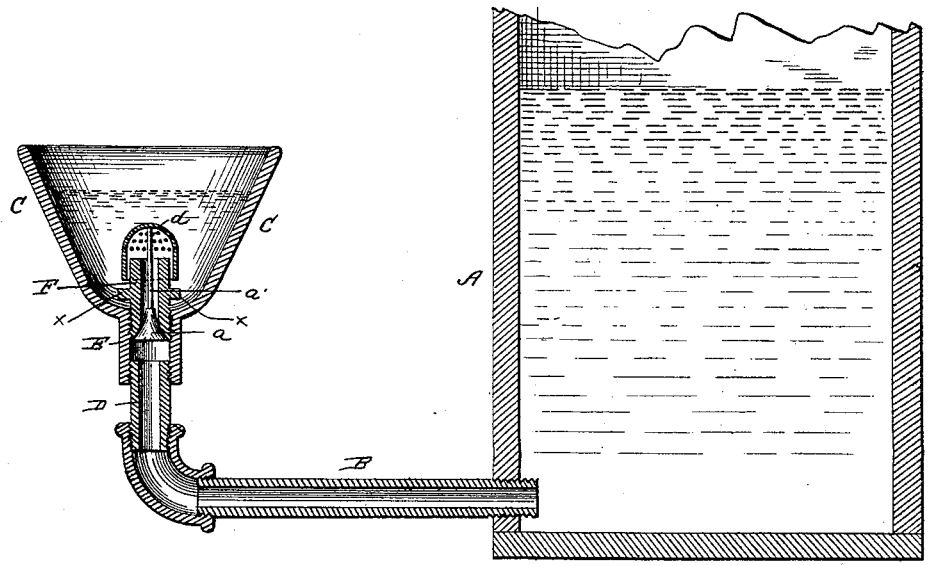
Figure 2:
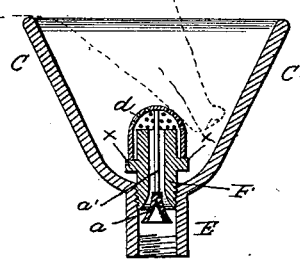

The operation of this invention is very simple. The animal approaches the bowl, and, as seen in dotted lines, Fig. 2, rests its jaw upon the cap $d$. Said cap is thus forced down, and with it the rod $a'$ and the hollow valve $a$. The water flows into the bowl through the perforations in the cap as long as the animal is drinking; but as soon as it removes its head from the bowl the water, acting against the bell-shaped hollow valve, raises it into its seat in the pipe, and thus cuts off the flow.

Having thus fully described my invention, what I claim as new, and desire to secure by Letters Patent, is—

1. The pipe F within the bowl or fountain, said pipe being flanged and provided at its lower end with a valve-seat, the perforated cap $d$, the stem $a'$, and the hollow valve $a$, in combination with a conducting-pipe and a water-reservoir, substantially as and for the purpose set forth.

2. A hollow valve and perforated cap connected together by a suitable stem, in combination with the pipe F and the bowl C, substantially as and for the purpose set forth.

In testimony whereof I affix my signature in presence of two witnesses.

ANDREW J. BALCH.

Witnesses:
   H. D. MARKEL,
   A. H. ROYER.